Patented July 18, 1950

2,515,275

UNITED STATES PATENT OFFICE 2,515,275

PHOTOSENSITIVE GLASS

Stanley Donald Stookey, Corning, N. Y., assignor to Corning Glass Works, Corning, N. Y., a corporation of New York No Drawing. Application January 9, 1948, Serial No. 1,492

10 Claims. (Cl. 49—92)

This invention relates to the manufacture of photosensitive glasses and articles thereof, that is, glasses in which exposure to short-wave radiations such as ultraviolet brings about a change in the glass as a result of which irradiated areas are capable of heat developed coloration, while non-irradiated areas remain substantially unchanged on heating.

In the pending applications Serial Number 513,441, filed by William H. Armistead, and Serial Numbers 513,443, 513,444 and 513,445, filed by Stanley D. Stookey, all of which were filed December 8, 1943, and assigned to the assignee of this application, there are described photosensitive glasses which contain as sensitizing constituents small amounts of either gold or silver or copper. The applications also show that the inclusion of a small amount of cerium dioxide in the glass, in addition to the sensitizing constituent, greatly improves the photosensitivity of the glass and the contrast and detail of the images and designs which may be formed therein. According to the aforesaid disclosures, the photosensitive glasses in which the sensitizing constituent is either gold or silver should preferably be melted oxidizingly, but the glasses which contain copper should be melted under reducing conditions. The glasses are at first colorless and transparent even after exposure to ultraviolet or other shortwave radiations, but when subsequently reheated at temperatures below their softening points, the irradiated areas become colored. If desired, the introduction of fluorine into the glasses causes them also to become opacified throughout when heated. Thus colored photographic images can be produced in the glass either with a transparent background or with an opal background. It is further pointed out in applications 513,443 and 513,445 that the presence in the glass of ultraviolet absorbing constituents and of certain oxides, including $As_2O_3$ and $Sb_2O_3$, should be avoided because they inhibit the photosensitivity of the glass. The necessary absence of these oxides increases the difficulty of fining the glass, that is, eliminating bubbles therefrom.

One of the chief objects of this invention is to remove the bubbles from photosensitive glasses during melting without diminishing the photosensitivity of the glass.

Another object is to increase the photosensitivity of the prior glasses.

I have now discovered that the introduction of up to about 0.1% of $Sb_2O_3$ into the prior glasses containing $CeO_2$ and either gold, silver or copper increases the photosensitivity of the glasses and aids in fining them. Extremely small amounts of $Sb_2O_3$ improve the photosensitivity of the glass and increasing amounts up to about 0.1% help to eliminate bubbles. More than about 0.1% $Sb_2O_3$ causes a decrease in photosensitivity, and 1% or more completely destroys it. On the contrary, $As_2O_3$, although effective in the elimination of bubbles, destroys the photosensitivity even when present in quantities as small as a few hundredths of one per cent.

The invention is generally effective in silicate glasses and is particularly effective in glasses which contain an oxide of a metal of the second periodic group up to and including barium or a plurality of such oxides, it being known that the remaining elements of this group, mercury and radium, are not used for making glass.

Glasses in which the sensitizing constituent is gold should contain from about 0.01% to 0.1% of gold computed as Au and preferably about 0.02% to 0.03% by weight. Larger amounts neither increase nor diminish the photosensitivity but are wasteful of this expensive ingredient and hence are not recommended. The gold is preferably utilized as the chloride by dissolving gold in acid and adding the solution to the glass batch. As pointed out above, the batch preferably should contain an oxidizing agent, such as an alkali metal nitrate.

Glasses in which the sensitizing constituent is silver preferably should contain silver equivalent to about 0.05% to 0.3% AgCl. The silver preferably is incorporated in the batch as the chloride but any compound of silver may be employed. An oxidizing agent also is preferably included in the batch.

Glasses in which the sensitizing constituent is copper preferably should contain about 0.05% to 1% of copper computed as $Cu_2O$. Generally about 0.5% produces the best result, but in making glass fibres for the production of photosensitive glass fabrics, up to 1% of copper computed as $Cu_2O$ or more may be required. The batch should contain a reducing agent such as sugar or ammonium chloride.

In the foregoing glasses the inclusion of up to 0.05% of $CeO_2$ improves the photosensitivity of the glass by increasing the exposure speed tenfold, that is, it decreases the time of exposure by a factor of ten. Amounts greater than about 0.05% $CeO_2$ prevent penetration of the effective radiations into the glass and hence inhibit photosensitivity.

A small limited amount of $SnO_2$ may also be added to the glasses if desired. It improves the photosensitivity but is only about half as effective as $CeO_2$. In the gold or silver-containing glasses more than about 0.02% $SnO_2$ destroys photosensitivity by causing coloration throughout the glass when heated. Copper-containing glasses may contain larger amounts, up to 0.5% $SnO_2$ or more if desired, without ill effect.

Constituents which inhibit photosensitivity and hence should be absent from the glass comprise oxides of arsenic, iron, manganese, vanadium, selenium, thallium, uranium. PbO in amounts greater than 1 to 2% is prohibitive. In the glasses which contain gold or silver as sensitizing constituents, the presence of copper destroys photosensitivity. However, the presence of both gold and silver in the same glass within the stated limits is not objectionable and produces heat-developed color in the irradiated glass, which is a combination of the colors produced by each alone.

As examples of glass compositions illustrating but not limiting the invention, the following batches in parts by weight are given:

position a sufficient amount of fluorine. It is impossible to specify the exact amount of fluorine which will be required in all cases because the amount will vary with the size of the batch, the time and temperature of melting, and the type of melting container employed. The proper amount for any given conditions may easily be determined by trial.

The fluorine-containing glasses are transparent and colorless when fabricated into ware, but when reheated at 500 to 600° C., they become opaque or light-diffusing. Such a glass, when irradiated with short-wave radiations before reheating and while it is transparent, is affected so that when it is thereafter reheated, it not only becomes opaque or light-diffusing, but the irradiated parts of the glass become permanently colored. If selectively irradiated, that is, if parts of the glass are shielded from the effective radiations, the shielded parts will be opacified but not colored on being reheated. By this means ornamental designs and images can be reproduced in the glass by conventional photographic printing methods and such images and designs will appear with a high degree of sharpness and detail against the opacified background.

As examples of compositions for opacifiable glasses illustrating but not limiting the inven-

*Table I*

|  | 1 | 2 | 3 | 4 | 5 | 6 | 7 | 8 | 9 |
|---|---|---|---|---|---|---|---|---|---|
| Sand | 100 | 100 | 100 | 100 | 100 | 100 | 100 | 330 | 330 |
| $Na_2CO_3$ | 42 | 31 | 26 | 26 | 26 | 30 | 30 | 139 | 139 |
| $NaNO_3$ |  | 8 | 8 | 8 | 8 | 7 | 7 |  |  |
| $Al(OH)_3$ | 3.3 | 8 | 4 | 4 | 4 |  |  | 10.5 | 10.5 |
| $BaCO_3$ | 15 | 15 | 16 | 16 | 16 |  | 17 |  |  |
| ZnO |  |  |  |  |  | 13 |  |  |  |
| $CaCO_3$ |  |  | 15 | 15 | 15 |  |  | 70 | 70 |
| $CeO_2$ | .052 | .05 | .05 | .05 | .05 | .05 | .05 | .2 | .2 |
| $SnO_2$ |  |  |  |  |  |  |  |  | 1.2 |
| $CaSO_4$ |  |  | 0.85 |  |  |  |  |  |  |
| $Sb_2O_3$ | .025 | .026 | .026 | .026 | .026 | .02 | .02 | .03 | .03 |
| Salt cake |  |  |  |  | 0.85 |  |  |  |  |
| Au | .013 | .03 | .025 | .025 | .025 |  | .014 |  |  |
| AgCl |  |  |  |  |  | .14 | .14 |  |  |
| CuO |  |  |  |  |  |  |  | .5 | .5 |
| Sugar |  |  |  |  |  |  |  | 2 |  |
| $NH_4Cl$ |  |  |  |  |  |  |  |  | 9 |

Each of the above batches contains $Sb_2O_3$ which fines the glass during melting and increases its photosensitivity. Although the presence of $Sb_2O_3$ is sufficient for fining the glass, I have found that up to about 1%, of a sulfate such as $CaSO_4$ or salt cake, introduced into the batch, on the oxide basis in addition to the $Sb_2O_3$ as shown in Examples 3 and 5, seems to further improve the fining rate of the glass and to increase its photosensitivity very slightly but appreciably. Compositions 3, 4 and 5 are particularly suitable for the production of rolled sheet glass.

The glasses resulting from melting the batches of Table I are transparent but in come cases it may be desirable that they be opacified throughout in order to provide a white background for the image or design to be formed in the glass by selective irradiation followed by heat treatment. The glasses may be rendered thermally and controllably opacifiable by including in their comtion, the following batches, in parts by weight, are given:

*Table II*

|  | 10 | 11 | 12 | 13 | 14 | 15 |
|---|---|---|---|---|---|---|
| Sand | 100 | 100 | 100 | 100 | 100 | 100 |
| $Na_2CO_3$ | 22 | 22 | 38 | 33 | 46 | 22 |
| $K_2CO_3$ | 10 | 10 |  |  |  | 10 |
| $NaNO_3$ |  |  | 2 | 2 | 4 |  |
| $Al(OH)_3$ | 13 | 15 | 4 | 4 |  | 15 |
| $BaCO_3$ | 16 | 16 |  |  |  |  |
| ZnO |  |  | 12 |  |  | 12 |
| SrO |  |  |  | 19 |  |  |
| $Na_2SiF_6$ | 5 | 5 | 5 | 10 |  | 5 |
| $Na_3AlF_6$ |  |  |  |  | 14 |  |
| NaCl |  | 1.8 | 1.8 |  | 1 | 1.8 |
| $NH_4Cl$ | 1.8 |  |  |  |  |  |
| $CeO_2$ | .05 | .05 | .05 | .07 | .04 | .05 |
| $SnO_2$ | .35 |  |  |  |  |  |
| $Sb_2O_3$ | .05 | .025 | .02 | .02 | .03 | .03 |
| CuO | .15 |  |  |  |  |  |
| Au |  | .014 | .02 | .02 | .014 |  |
| AgCl |  |  |  |  |  | .13 |

In the above compositions each batch contains a fluoride as an opacifying agent, a compound of gold, silver or copper as a sensitizing agent, $CeO_2$ for increasing the photosensitivity and $Sb_2O_3$ for increasing the photosensitivity and eliminating bubbles during melting. Batches containing copper contain also a reducing agent which may be a carbonaceous material or ammonium chloride. The chloride seems also to assist in the opacification of the glass and for this reason, although it is not essential, sodium chloride is added to those batches which contain no ammonium chloride. The batches which contain gold or silver are free from reducing agents. The amounts of opacifying and reducing agents will vary with the size and conditions of melting. The above batches, when melted for about 4 hours at about 1350° C. in crucibles of one-pound capacity, produce transparent, colorless photosensitive glasses which are free from bubbles and which become opacified throughout when reheated at 500° to 600° C.

The time or duration of exposure to short-wave radiations which is necessary in order to obtain an effect in the glasses of Tables I and II which can be developed into a coloration by heating will vary, depending upon the intensity of the effective radiations, that is, the source of the radiations and its distance from the glass during exposure. The time and intensity necessary for a desired effect can easily be determined by trial. For example, a five-minute direct exposure at a distance of eight inches from a 60-ampere carbon arc will produce a blue coloration in a glass containing gold, $CeO_2$ and an oxidizing agent when subsequently heated for about 30 minutes at 550° C. Somewhat longer exposures are required for the copper and silver-containing glasses.

Although ultraviolet emitting lamps, such as the carbon arc or the quartz mercury arc, are convenient sources of short-wave radiations effective for my purpose, it is my intention to include X-rays, radioactive radiations, etc., within the scope of the invention.

The temperature or time of heat treatment of the glasses necessary for the development of coloration in the irradiated parts will depend upon how greatly the photosensitizing constituent in the glass has been affected by the irradiation. The most suitable temperatures are between 500° and 600° C. Long treatments at the lower temperatures are as effective as short treatments at the higher temperatures. Thirty minutes at 550° C. is a suitable average heat treatment.

The color which is produced in the glasses depends upon the photosensitizing constituent which is present, and in the case of gold it depends also upon the time and intensity of the exposure and the duration and temperature of heating. Copper-containing glasses develop various shades of red. The color of the gold-containing glasses may vary from blue through lavender, purple, and maroon to red, changing in that order as the effective exposure is increased or as the time and temperature of heating are raised. The silver-containing glasses develop either a bright yellow or an amber color. In general, the silver-containing glasses resemble the gold-containing glasses in their reactions, and both silver and gold may be present in the same glass whereupon the resulting colors will be various shades of red and amber. Like the gold glass, the photosensitive effects of the silver glass are inhibited by the presence of substantial copper.

As a result of the improved photosensitivity of the glasses according to the invention due to the presence therein of both $CeO_2$ and $Sb_2O_3$, photographic negatives can be employed in the conventional manner using an ultraviolet light source or even direct sunlight to make heat-developed images in the glass, the images being equal in detail and contrast to chemically reduced images printed in like manner upon photographic printing paper.

The term "silicate glass" as used in the claims means a glass prepared by fusion of raw glass-making materials containing on the oxide basis a major proportion of silica and a minor proportion of an alkali metal oxide such as sodium oxide or potassium oxide, preferably containing a minor proportion of an oxide of a metal of the second periodic group up to and including barium or a plurality of such oxides, optionally containing a minor proportion of another conventional glass-forming oxide such as $Al_2O_3$ and PbO, and, if desired, containing sufficient fluorine to make the glass thermally opacifiable, but being free of constituents which inhibit photosensitivity including compounds of arsenic, iron, manganese, vanadium, selenium, thallium, and uranium and also over 2% PbO.

I claim:

1. A photosensitive glass consisting essentially of a silicate glass containing on the oxide basis by weight the indicated proportion of a photosensitizing constituent selected from the group consisting of 0.01% to 0.1% gold computed as Au, 0.05% to 0.3% silver computed as AgCl, and 0.05% to 1% copper computed as $Cu_2O$, up to 0.05% $CeO_2$, and up to 0.1% $Sb_2O_3$.

2. A photosensitive glass consisting essentially of a silicate glass containing, on the oxide basis by weight as calculated from the batch, the indicated proportion of a photosensitizing constituent selected from the group consisting of 0.01% to 0.1% gold computed as Au, 0.05% to 0.3% silver computed as AgCl, and 0.05% to 1% copper computed as $Cu_2O$, up to 0.05% $CeO_2$, and up to 0.1% $Sb_2O_3$, and also containing $SO_3$ in an amount up to 1%.

3. A photosensitive glass consisting essentially of a thermally opacifiable, fluorine-containing silicate glass containing on the oxide basis by weight the indicated proportion of a photosensitizing constituent selected from the group consisting of 0.01% to 0.1% gold computed as Au, 0.05% to 0.3% silver computed as AgCl, and 0.05% to 1% copper computed as $Cu_2O$, up to 0.05% $CeO_2$, and up to 0.1% $Sb_2O_3$.

4. A photosensitive glass consisting essentially of an oxidized silicate glass containing on the oxide basis by weight 0.01% to 0.1% gold computed as Au, up to 0.05% $CeO_2$, and up to 0.1% of antimony oxide computed as $Sb_2O_3$.

5. A photosensitive glass consisting essentially of an oxidized silicate glass containing on the oxide basis by weight 0.05% to 0.3% of silver computed as AgCl, up to 0.05% $CeO_2$, and up to 0.1% of antimony oxide computed as $Sb_2O_3$.

6. A photosensitive glass consisting essentially of a reduced silicate glass containing on the oxide basis by weight 0.05% to 1% copper computed as $Cu_2O$, up to 0.05% cerium oxide computed as $CeO_2$, and up to 0.1% $Sb_2O_3$.

7. A photosensitive glass consisting essentially of a reduced silicate glass containing on the oxide basis by weight 0.05% to 1% copper computed as $Cu_2O$, up to 0.05% cerium oxide computed as $CeO_2$, up to 0.1% $Sb_2O_3$, and up to 0.5% tin oxide computed as $SnO_2$.

8. An article comprising a body of irradiated photosensitive glass consisting essentially of a silicate glass containing on the oxide basis by weight the indicated proportion of a photosensitizing constituent selected from the group consisting of 0.01% to 0.1% gold computed as Au, 0.05% to 0.3% silver computed as AgCl, and 0.05% to 1% copper computed as $Cu_2O$, up to 0.05% $CeO_2$, and up to 0.1% $Sb_2O_3$, said glass body containing within its mass a predetermined latent photographic image capable of being developed, by uniform heating of the entire glass body, into a visible, colored image exhibiting photographic detail.

9. An article comprising a glass body made of a photosensitive glass consisting essentially of a silicate glass containing on the oxide basis by weight the indicated proportion of a photosensitizing constituent selected from the group consisting of 0.01% to 0.1% gold computed as Au, 0.05% to 0.3% silver computed as AgCl, and 0.05% to 1% copper computed as $Cu_2O$, up to 0.05% $CeO_2$, and up to 0.1% $Sb_2O_3$, selected portions of said glass body being colored by the photosensitizing constituent to form within its mass a heat-stable image exhibiting photographic detail.

10. An article comprising a glass body made of a photosensitive glass consisting essentially of an oxidized, silicate glass containing on the oxide basis by weight 0.01% to 0.1% gold computed as Au, up to 0.05% $CeO_2$ and up to 0.1% of antimony oxide computed as $Sb_2O_3$, selected portions of said glass body being colored by the gold to form within its mass a heat-stable image exhibiting photographic detail.

STANLEY DONALD STOOKEY.

REFERENCES CITED

The following references are of record in the file of this patent:

UNITED STATES PATENTS

| Number    | Name    | Date          |
|-----------|---------|---------------|
| 2,049,765 | Fischer | Aug. 4, 1936  |
| 2,422,472 | Dalton  | June 17, 1947 |